(12) United States Patent
Rini et al.

(10) Patent No.: US 7,118,721 B2
(45) Date of Patent: Oct. 10, 2006

(54) METHOD FOR TREATING EMISSIONS

(75) Inventors: Michael J. Rini, Knoxville, TN (US); Mou Jian, Knoxville, TN (US); Thomas S. Raines, Knoxville, TN (US); Marie L. Aumaugher, Oak Ridge, TN (US); Noel C. Kuck, Oak Ridge, TN (US); Arlyn V. Petig, Knoxville, TN (US); David K. Anderson, East Longmeadow, MA (US); Frederic Kozak, Knoxville, TN (US); Keri N. Cochran, Knoxville, TN (US); James A. Yann, Knoxville, TN (US); Tom C. Lillestolen, Lenoir City, TN (US); Robert G. Hilton, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 621 days.

(21) Appl. No.: 10/305,820

(22) Filed: Nov. 26, 2002

(65) Prior Publication Data

US 2006/0204417 A1 Sep. 14, 2006

(51) Int. Cl.
*C01B 21/00* (2006.01)
(52) U.S. Cl. .................. 423/239.1; 423/210; 423/235
(58) Field of Classification Search ........... 423/235, 423/239.1, 210; 422/171; 122/4 D
See application file for complete search history.

(56) References Cited

U.S. PATENT DOCUMENTS

| 3,969,089 | A |   | 7/1976  | Moss et al. |        |
|-----------|---|---|---------|-------------|--------|
| 4,353,206 | A |   | 10/1982 | Lee         |        |
| 4,353,207 | A |   | 10/1982 | Lee         |        |
| 4,435,148 | A |   | 3/1984  | Moss        |        |
| 4,919,170 | A | * | 4/1990  | Kallinich et al. | 138/39 |
| 5,078,973 | A | * | 1/1992  | Kuroda et al. | 422/171 |
| 5,224,334 | A | * | 7/1993  | Bell | 60/274 |
| 5,603,909 | A |   | 2/1997  | Varner et al. | |
| 5,775,266 | A |   | 7/1998  | Ziegler | |
| 5,988,115 | A | * | 11/1999 | Anderson et al. | 122/4 D |
| 6,086,241 | A | * | 7/2000  | Herr et al. | 366/181.5 |
| 6,257,155 | B1 |  | 7/2001  | Greene | |

FOREIGN PATENT DOCUMENTS

| DE | 37 05 705 | 1/1988 |
| EP | 0 013 590 | 7/1980 |
| EP | 0 030 152 | 6/1981 |
| EP | 0 061 326 | 9/1982 |
| EP | 0 583 771 | 2/1994 |
| EP | 1 002 767 | 5/2000 |
| EP | 1 281 747 | 2/2003 |

OTHER PUBLICATIONS

PCT International Search Report dated Mar. 24, 2004.
CO₂ Acceptor Gasification Process—George P.Curran, Carl E. Fink, and Everett Gorin ResearchDivision, Consolidation Coal Co., Library, Pa (pp. 141-165) (XP008023920).

* cited by examiner

*Primary Examiner*—Edward M. Johnson
(74) *Attorney, Agent, or Firm*—Arthur E. Fournier, Jr.; Timothy J. Olson

(57) ABSTRACT

A method for removing pollutants from flue gas generated by a plant having one or more burners located at an inlet end of a vertically extending stack, the flue gas being discharged through an outlet end of the stack. The pollutants are removed by an emission treatment system which includes a major component module and inlet and outlet ductwork providing fluid communications between the stack and the major component module. The major component module includes an SCR segment, a heat exchanger segment, and an ID fan, the SCR segment having at least one catalyst unit composed of materials for selectively catalyzing at least one pollutant. The method comprises the steps of drawing the flue gas from the stack and through the major component module with the ID fan, removing the pollutant from the flue gas with the SCR segment to produce a clean flue gas, and discharging the clean flue gas to the stack with the ID fan.

19 Claims, 10 Drawing Sheets

METHOD FOR TREATING EMISSIONS

BACKGROUND OF THE INVENTION

This invention relates generally to processes and apparatus for the removal of nitrogen oxides or "$NO_x$" (principally nitric oxide (NO) and nitrogen dioxide ($NO_2$)) from exhaust gases and the like. More particularly, the present invention relates to processes and apparatus for reducing $NO_x$ selectively from exhaust gases produced during petroleum refining, petrochemical production and also to industrial processes producing exhaust gases containing $NO_x$.

Carbonaceous fuels are burned in internal combustion engines and in a wide variety of industrial process (i.e. boilers, furnaces, heaters and incinerators, petroleum refining, petrochemical production, and the like). Excess air frequently is used to complete the oxidation of combustion byproducts such as carbon monoxide (CO), hydrocarbons and soot. Free radicals of nitrogen ($N_2$) and oxygen ($O_2$) combine chemically to form $NO_x$, primarily NO, at high combustion temperatures. This thermal $NO_x$ tends to form even when nitrogen is not present in the fuel. Combustion modifications which decrease the formation of thermal $NO_x$ generally are limited by the generation of objectionable byproducts or deteriorating flame properties.

When discharged to the air, NO emissions oxidize to form $NO_2$, which in the presence of sunlight reacts with volatile organic compounds to form ground level ozone, eye irritants and photochemical smog. Despite advancements in fuel and combustion technology, ground level ozone concentrations still exceed federal guidelines in many urban regions. Under the Clean Air Act and its amendments, these ozone non-attainment areas must implement stringent $NO_x$ emissions regulations. Such regulations require low $NO_x$ emissions levels that are attained only by exhaust after-treatment. When an exhaust after-treatment system is applied to a refinery or petrochemical plant, it is particularly important to minimize any impact on the operation of the underlying refining or petrochemical process.

Exhaust after-treatment techniques tend to reduce $NO_x$ using various chemical or catalytic methods. Such methods are known in the art and involve non-selective catalytic reduction (NSCR), selective catalytic reduction (SCR) or selective noncatalytic reduction (SNCR). Alternatively, NO may be oxidized to $NO_2$ for removal by wet scrubbers. Such after-treatment methods typically require some type of reactant for removal of $NO_x$ emissions.

Wet scrubbing of $NO_2$ produces waste solutions that represent potential sources of water pollution. Wet scrubbers primarily are used for $NO_x$ emissions from nitric acid plants or for concurrent removal of $NO_2$ with sulfur dioxide ($SO_2$). High costs and complexity generally limit scrubber technology to such special applications.

The NSCR method typically uses unburned hydrocarbons and CO to reduce $NO_x$ emissions in the absence of $O_2$. Fuel/air ratios must be controlled carefully to ensure low excess $O_2$. Both reduction and oxidation catalysts are needed to remove emissions of CO and hydrocarbons while also reducing $NO_x$. The cost of removing excess $O_2$ precludes practical applications of NSCR methods to many $O_2$-containing exhaust gases.

Chemical reactions on a solid catalyst surface of commercial SCR systems convert $NO_x$ to $N_2$. These solid catalysts are selective for $NO_x$ removal and do not reduce emissions of CO and unburned hydrocarbons. Large catalyst volumes are normally needed to produce low levels of $NO_x$. The catalyst activity depends on temperature and declines with use. Normal variations in catalyst activity are accommodated only by enlarging the volume of catalyst or limiting the range of combustion operation. Catalysts may require replacement prematurely due to sintering or poisoning when exposed to high levels of temperature or exhaust contaminants.

Commercial SCR systems primarily use ammonia ($NH_3$) as the reductant. Excess $NH_3$ needed to achieve low $NO_x$ levels tends to result in $NH_3$ breakthrough as a byproduct emission. Even under normal operating conditions, SCR systems require a uniform distribution of $NH_3$ relative to NO in the exhaust gas. $NO_x$ emissions, however, are frequently distributed nonuniformly, so low levels of both $NO_x$ and $NH_3$ breakthrough may be achieved only by controlling the distribution of injected $NH_3$ or mixing the exhaust to a uniform $NO_x$ level.

SUMMARY OF THE INVENTION

Briefly stated, the invention in a preferred form is a method for removing pollutants from flue gas generated by a plant having one or more burners located at an inlet end of a vertically extending stack, the flue gas being discharged through an outlet end of the stack. The pollutants are removed by an emission treatment system which includes a major component module and inlet and outlet ductwork providing fluid communications between the stack and the major component module. The major component module includes an SCR segment, a heat exchanger segment, and an ID fan, the SCR segment having at least one catalyst unit composed of materials for selectively catalyzing at least one pollutant. The method comprises the steps of drawing the flue gas from the stack and through the major component module with the ID fan, removing the pollutant from the flue gas with the SCR segment to produce a clean flue gas, and discharging the clean flue gas to the stack with the ID fan.

When the pollutant to be removed is $NO_x$, the emission treatment system also includes an ammonia addition subsystem which is in fluid communication with the inlet ductwork, and at least one catalyst unit is composed of materials for selectively catalyzing $NO_x$. In addition, the method also comprises the step of mixing ammonia vapor with the flue gas upstream of the SCR segment. The ammonia vapor is mixed with the flue gas by injecting the ammonia vapor into the inlet ductwork and mixing the ammonia vapor with the flue gas over the length of the inlet ductwork. The mixing is facilitated by creating turbulence in the flue gas by changing the direction of flue gas flow from a vertical direction in the stack to a horizontal direction in the inlet ductwork.

The ammonia addition subsystem includes a source of ammonia vapor, an ammonia injection grid disposed in the inlet ductwork, an ammonia vapor pipe providing fluid communication between the source of ammonia vapor and the ammonia injection grid, and a throttle valve disposed in the ammonia vapor pipe. The rate of ammonia addition is controlled by regulating the throttle valve with an ammonia addition controller. In a first control scheme, the throttle valve is regulated on the basis of the flue gas flow rate and the level of $NO_x$ entering and exiting the emission treatment system. In a second control scheme, the throttle valve is regulated on the basis of ammonia carry-over. In a third control scheme, the throttle valve is regulated on the basis of the fuel flow rate and the composition of the fuel.

The flow rate of the flue gas through the major component module is controlled by regulating the pressure decrease across the ID fan with a controller. A damper controlling the pressure decrease across the ID fan is regulated on the basis of the ID fan supply and discharge pressures and the differential pressures across the SCR and heat exchange segments.

The plant also has a boiler and a feed pump circulating feedwater to the boiler, the flow of the feedwater through the heat exchange segment is controlled by regulating the speed of the feed pump with a pump speed controller. The feed pump is regulated on the basis of the feedwater temperature and pressure in the feed and return lines.

It is an object of the invention to provide a method of removing pollutants from flue gas which is easily adapted to the removal of many pollutants.

It is also an object of the invention to provide a method of removing pollutants from flue gas which is relatively simple to perform.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

As concern for the environment grows, greater efforts are being undertaken to reduce emissions of known pollutants, such as particulate matter, $NO_x$, $SO_x$, mercury, etc, by the promulgation of more stringent control requirements. For the refinery and petrochemical industries, the first of these more stringent requirements focuses on $NO_x$ reduction.

With reference to the drawings wherein like numerals represent like parts throughout the several figures, an emission treatment system 10 in accordance with the present invention reduces $NO_x$ by SCR technology, provides for future emissions control of other pollutants, and is a stand-alone system that may be installed on the ground along side the existing equipment, or on legs along side the existing equipment, or on top of the existing equipment, thereby reducing the downtime of the refinery or petrochemical production equipment.

Figure 1:
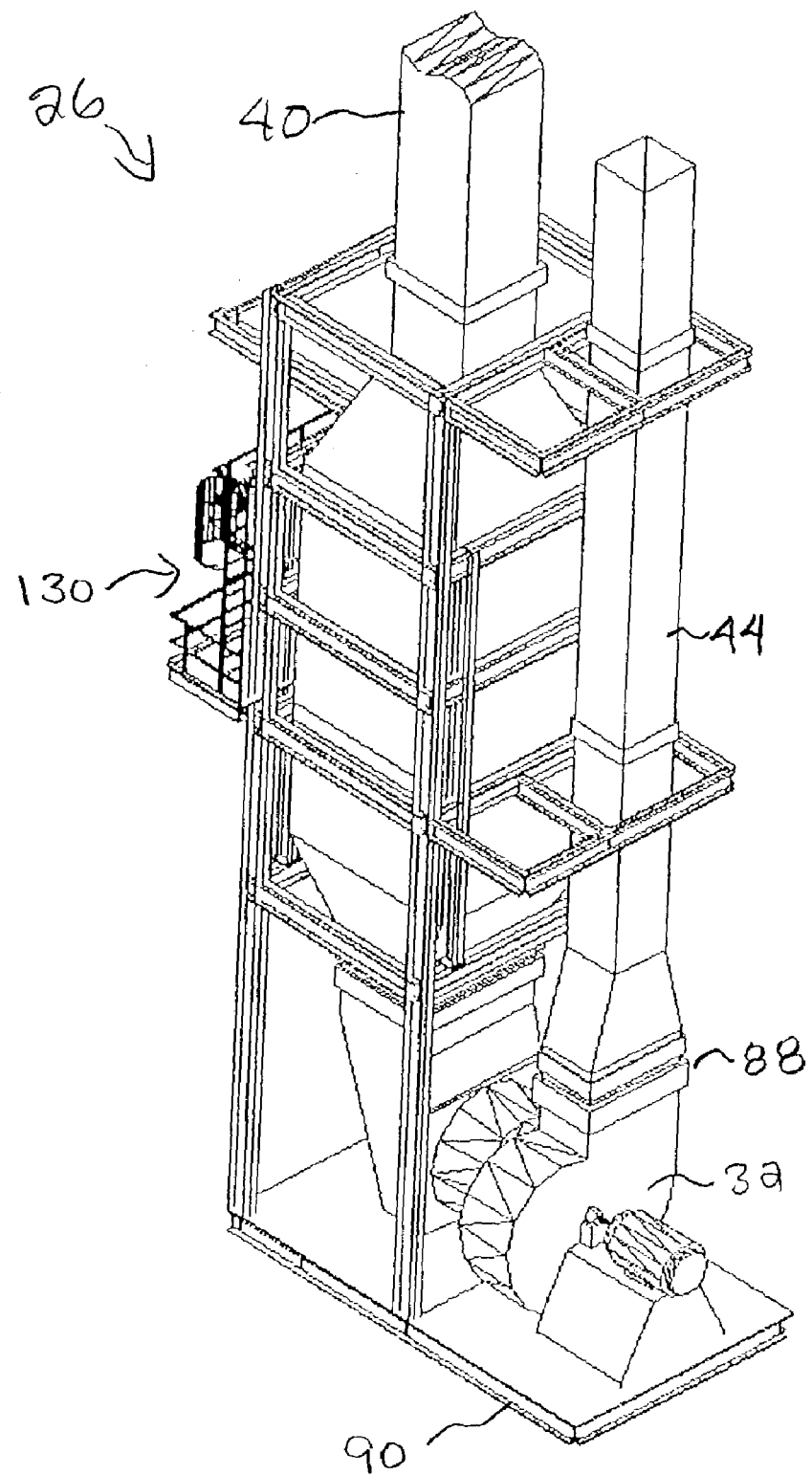
FIG. 1 is a perspective view of an emission treatment system in accordance with the invention.
Figure 2:
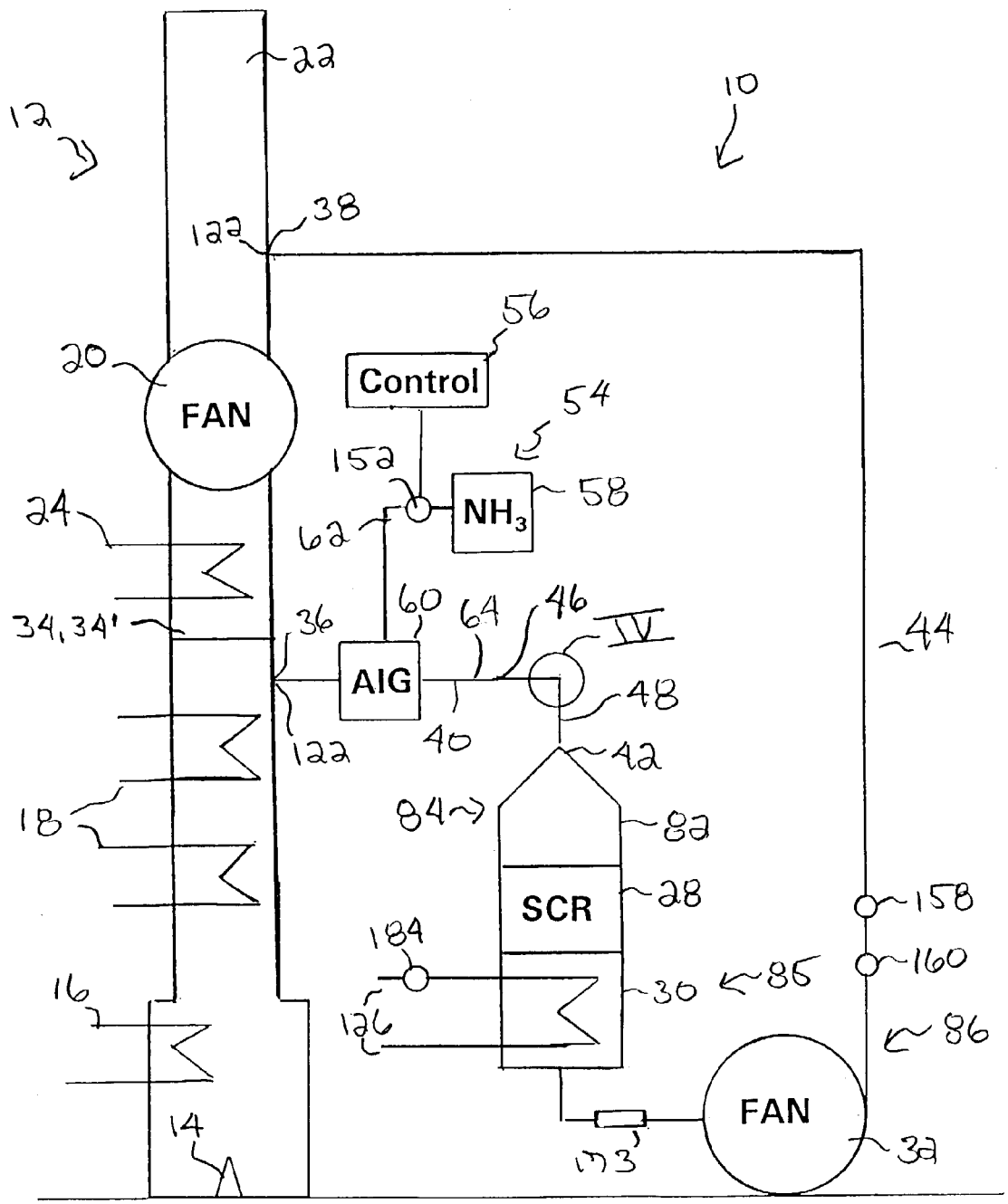
FIG. 2 is a simplified, schematic view, partly in cross section, of the system of FIG. 1 installed on an ethylene heater.

The emission treatment system 10 may be utilized with most refinery and petrochemical production systems. However, for descriptive purposes, the system 10 is described herein installed with an ethylene-cracking furnace 12 (FIG. 2). Fuel is fired by burners 14 located at the bottom or side of the furnace 12 generating high temperature gas and $NO_x$. The "cracking" of hydrocarbon molecules into simpler molecules occurs in a coil 16 in this highest temperature zone. As the furnace gases pass upward through the furnace, heat is recovered from the flue gas by a series of additional coils 18 which contain either cracking feedstock for preheating or water/steam for use in this process or other processes. Typically, ethylene-cracking furnaces 12 have one or more induced draft (ID) fans 20 located on top of the heater connected by a vertical stack 22. Ethylene-cracking furnaces 12 typically run for several years between significant outages and are a key provider of feedstock for other processes within the refinery or petrochemical plant. Therefore, the downtime to install an SCR is severely limited and costly to the owner.

SCR $NO_x$ removal processes are typically most efficient at temperatures of 500–750° F. Gases at this temperature are typically found just upstream of the ethylene-cracking furnace boiler feedwater heating coil 24 and the ID fan 20. One conventional approach for an SCR retrofit is to shut down the furnace 12, cut into the stack 22 at the appropriate location, lift up the downstream sections and install the SCR. This is much too time consuming to be an economically attractive solution.

The subject emission treatment system 10 includes a stand-alone, modular major component module 26, typically at ground level, that includes an SCR segment 28, a boiler feedwater heat exchange segment 30, and an ID fan 32. By "abandoning" the stack ID fan 20 and the ethylene-cracking furnace boiler feedwater heating coil 24 installed in the stack 22, the emission treatment system 10 is installed without requiring any major modifications to the ethylene-cracking furnace 12. This allows installation of the emission treatment system 10 without significantly interrupting use of the ethylene-cracking furnace 12. The major component module 26 may also be placed on legs above the ground, or even on top of the existing furnace 12, as individual application circumstances may require. The new, system ID fan 32 is sized to provide for the increased draft requirements of the emission treatment system 10, principally for the SCR segment 28. The boiler feedwater heat exchange segment 30 may have higher heat recovery efficiency than the stack boiler feedwater heating coil 24, depending on the design and materials of the stack boiler feedwater heating coil 24, providing an improvement in overall cycle efficiency and/or reduced fuel costs. The stand-alone nature of the system 10 allows for future modification of the SCR segment 28 or the addition of additional segments for emissions control of other pollutants.

Figure 4:
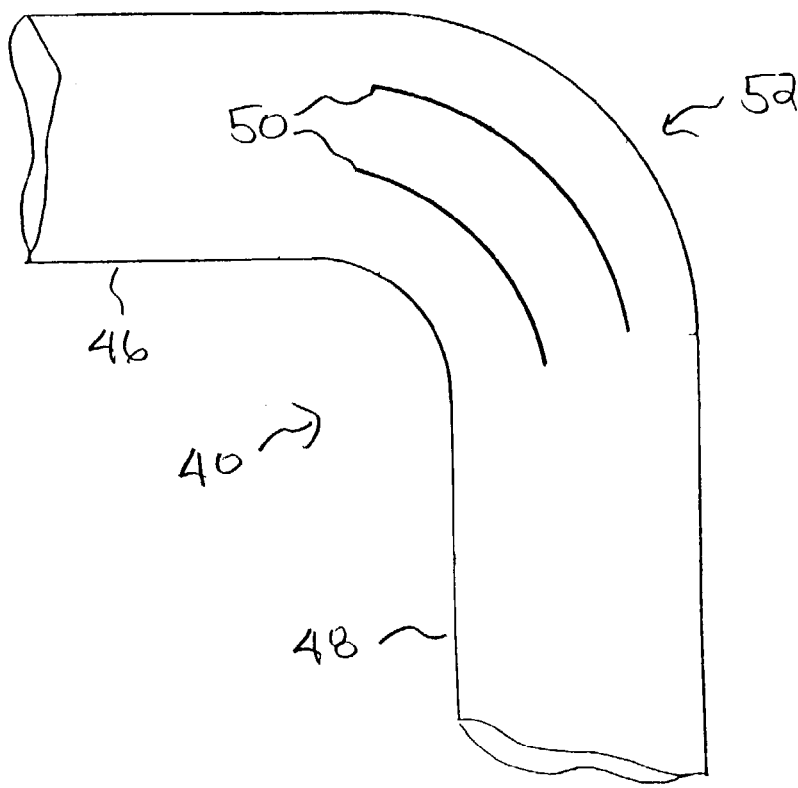
FIG. 4 is an enlarged, schematic, cross section view of Area IV of FIG. 2.
Figure 5:
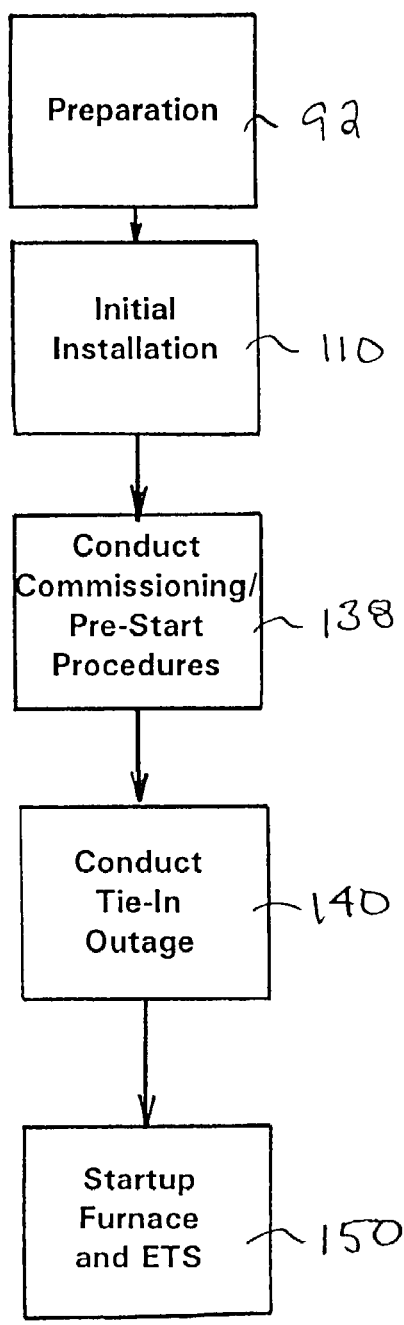
FIG. 5 is a flow diagram of the method of installing the emission treatment system of FIG. 1.
Figure 6:
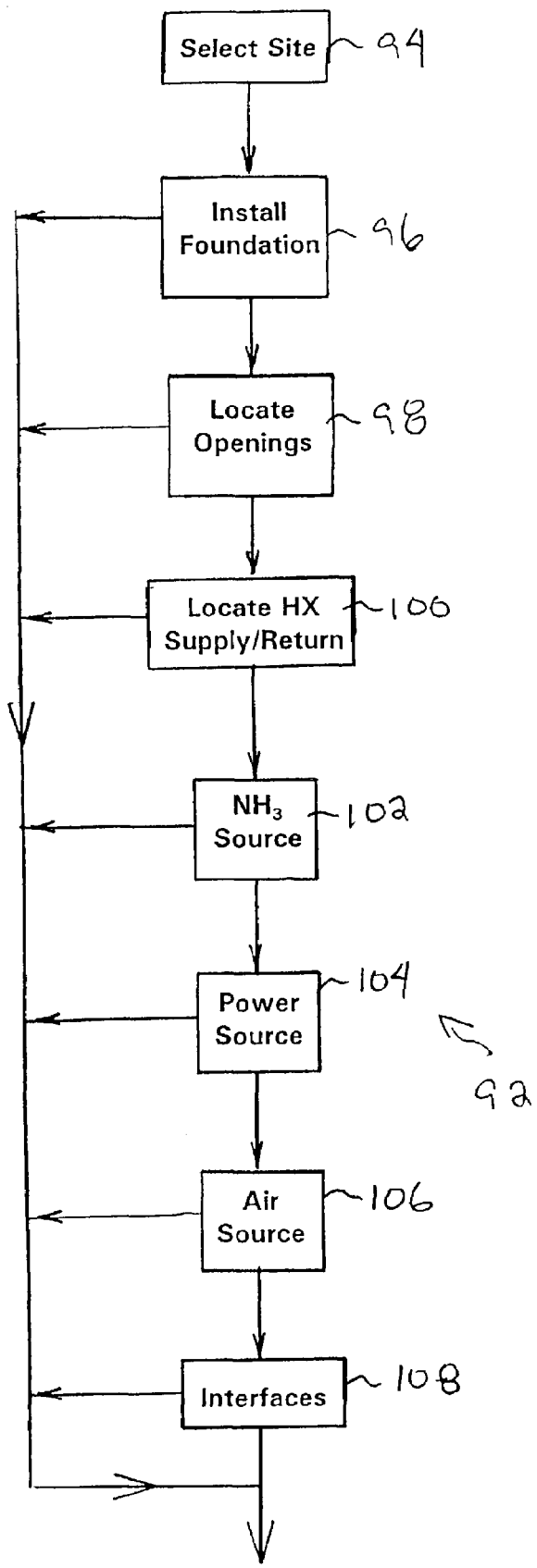
FIG. 6 is a flow diagram of the preparation sub-steps of the method of FIG. 5.
Figure 7A:
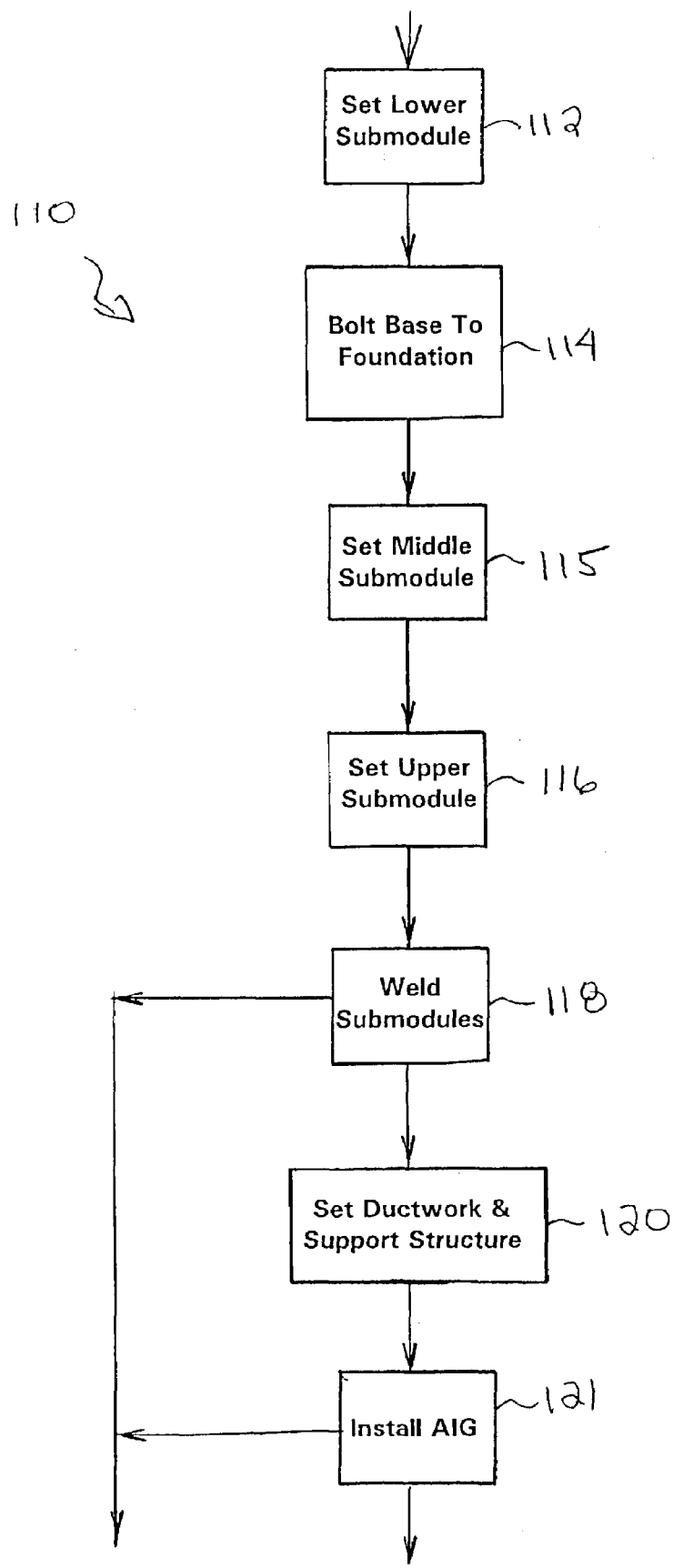
FIGS. 7a and 7b are a flow diagram of the initial installation sub-steps of the method of FIG. 5.
Figure 7B:
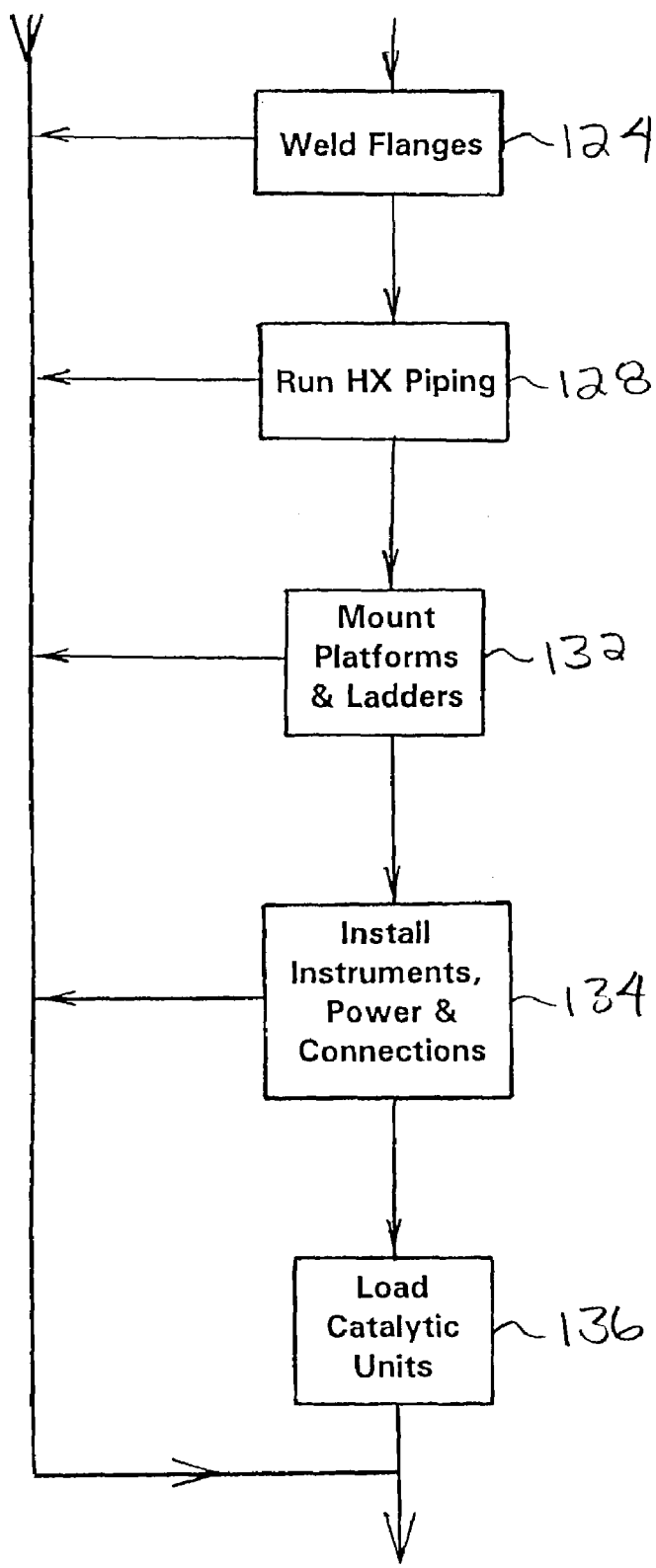
Figure 8:
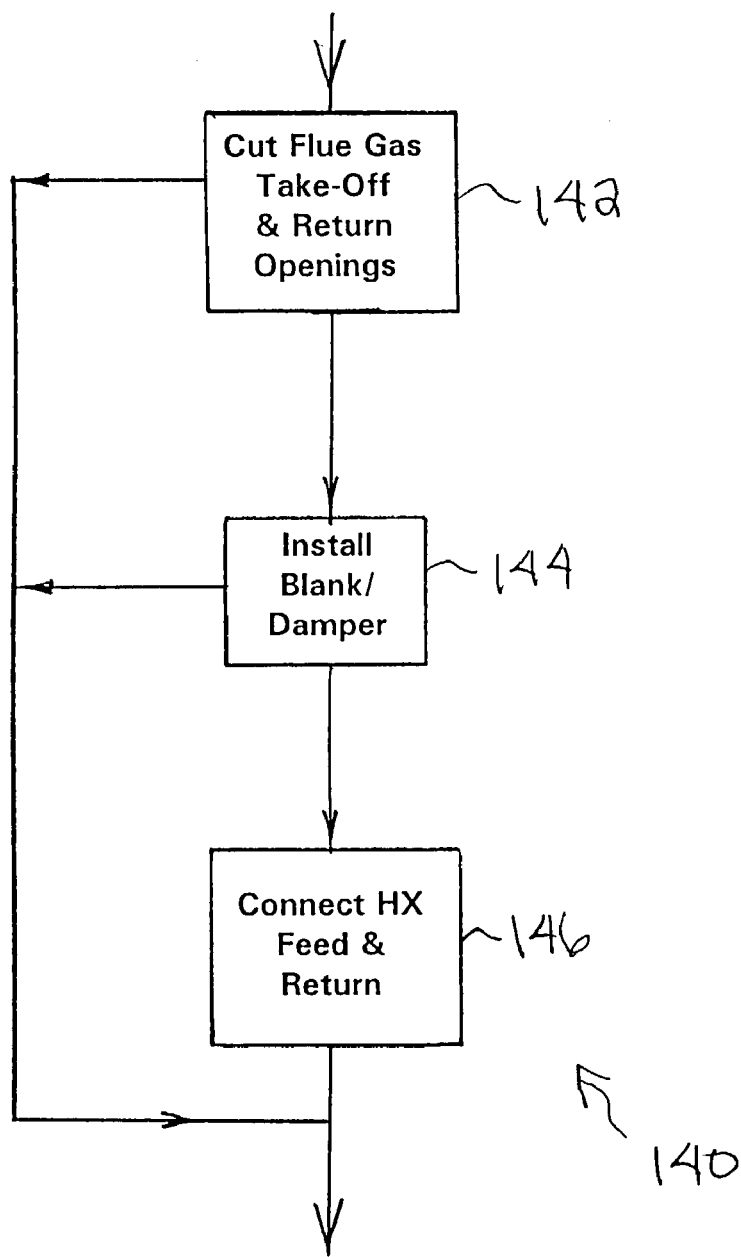
FIG. 8 is a flow diagram of the tie-in outage sub-steps of the method of FIG. 5.

With further reference to FIG. 2, the emission treatment system 10 also includes a blanking member 34 or bypass flapper 34' mounted within the vertical stack 22, just upstream of the ethylene-cracking furnace boiler feedwater heating coil 24. The blanking member 34 is installed across the stack 22 to permanently cutoff all flow through the ethylene-cracking furnace boiler feedwater heating coil 24 and the stack ID fan 20. The bypass flapper 34' is installed across the stack 22 to selectively cutoff all flow through the ethylene-cracking furnace boiler feedwater heating coil 24 and the stack ID fan 20. Flue gas take-off and return openings 36, 38 are formed in the stack 22 just upstream of the blanking member/bypass flapper 34, 34' and just downstream of the stack ID fan 20, respectively. Inlet ductwork 40 connected to flue gas take-off opening 36 and an inlet transition piece 42 in the upper end portion of the major component module 26 and outlet ductwork 44 connected to flue gas return opening 38 and the outlet of system ID fan 32 provide fluid communication between the stack 22 and the major component module 26. The inlet ductwork 40 includes a horizontal run 46 and a vertical run 48, each having a nominal length of thirty (30) feet. Dynamic vanes 50 may be positioned in the elbow 52 between horizontal run 46 and vertical run 48 to reduce the pressure drop through the elbow (FIG. 4).

Conventional utility boiler applications having SCR systems generally use ammonia ($NH_3$) as a reductant and include an ammonia addition system which provides a mixture of ammonia diluted with air or flue gas to uniformly distribute the ammonia across the face of the SCR catalyst, which is located a relatively short distance downstream of the injector. Accordingly, a conventional ammonia addition system consists of a control system, a source of ammonia ($NH_3$) vapor, a static mixer, at least one blower, and an injector which includes multiple spray lines, each having multiple spray nozzles. The ammonia vapor source injects ammonia vapor into the static mixer. Dilution air is blown by the blower(s) into the static mixer to dilute the ammonia vapor and propel the diluted ammonia vapor out of the ammonia addition subsystem via the injector nozzles.

The subject emission treatment system 10 includes an ammonia addition subsystem 54 which takes advantage of the relatively long lengths of the horizontal and vertical runs 46, 48 to provide for proper mixing of the ammonia vapor in the flue gas stream. The ammonia addition subsystem 54 does not include dilution air blowers, blower controls, and the larger diameter diluted ammonia ducting. The ammonia addition subsystem 54 consists of only three major components, a controller 56, a source of ammonia vapor 58, and an ammonia injection grid (AIG) 60. Only a small diameter ammonia vapor pipe 62 is needed. As discussed in greater detail below, the AIG 60 is preferably installed within ten (10) feet of the stack 22. A static mixer/diffuser 64 may be positioned in the horizontal run 46 in the event that the AIG 60 must be located at a significant distance from the stack 22 or to simply provide additional assurance of complete mixing of the ammonia vapor and the flue gas. The inlet transition piece 42 at the entrance to the major components module 26 distributes the ammonia vapor/flue gas mixture evenly across the inlet to the downstream SCR segment 28.

In addition, the AIG 60 is much simpler than the injectors of conventional systems, having a much reduced number of spray lines and no nozzles, the ammonia vapor being sprayed through openings in the sidewall of the spray line. The exact number of spray lines and openings is dependent on the installation specific parameters, such as the flue gas flow rate and the required rate of ammonia addition. The AIG 60 is preferably located within ten feet of the stack 22 to take advantage of the turbulence within the flue gas steam created by the "bend" formed by the blanking member/bypass flapper 34, 34' and opening 36. The turbulence further ensures that the ammonia vapor is thoroughly mixed with the flue gas. Analysis has shown that sufficient ammonia/flue gas mixing occurs even if the AIG 60 is located in horizontal run 46 within ten (10) feet of the stack 22. It is possible that additional analysis would show that sufficient mixing will also occur at greater distances from the stack 22.

The motive force for injecting the ammonia vapor into the flue gas stream may provided by the vapor pressure of the ammonia in the ammonia source 58. As shown in Table 1, the pressure of the ammonia vapor is sufficient over a full range of expected ambient temperatures to provide the required motive force.

TABLE 1

| Ambient Temperature (° F.) | $NH_3$ Vapor Pressure (psia) |
|---|---|
| 30 | 60 |
| 70 | 129 |
| 100 | 242 |

Figure 3:
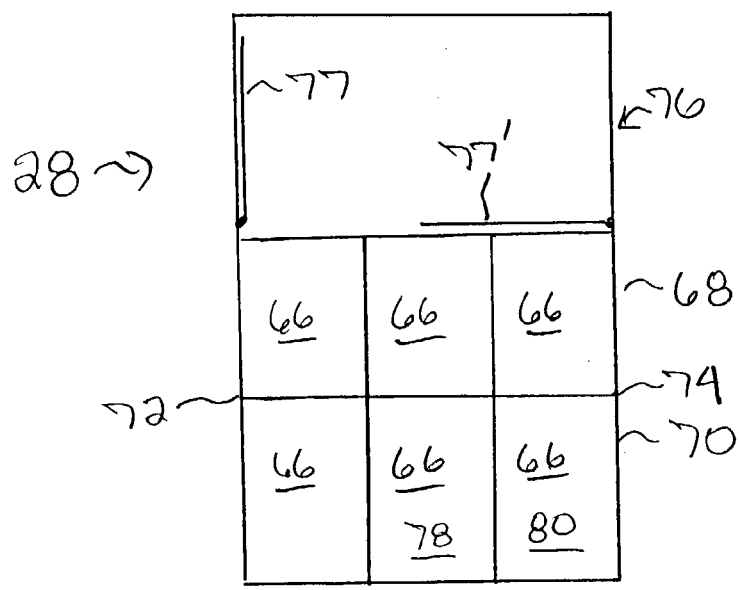
FIG. 3 is an enlarged, schematic, cross section view of the selective catalytic reduction segment of FIG. 2.

With reference to FIG. 3, the SCR segment 28 contains catalyst units 66 which remove $NO_x$. The catalyst units 66 are conventional units, each having nominal dimensions of three feet—three inches by six feet—six inches (3.25'×6.5'). As shown in FIG. 3, upper and lower groups 68, 70 of catalyst units 66, each including one to eight units 66, may be positioned within the SCR segment housing 72. Intermediate support rails 74 carry the weight of the upper group 68 of catalyst units 66, while allowing the flue gas/ammonia vapor mixture to access all of the catalyst units 66 contained within the SCR segment housing 72. If only three catalyst units 66 are required to remove the $NO_x$, a blanking mechanism 76 may be included in the SCR segment 28 to selectively block half of the catalyst units 66. Such a blanking mechanism 76 may comprise one or more flappers 77, 77' which each have a single side edge pivotally mounted to opposite inside surfaces of the housing 72. Initially, flapper 77 is in the vertical, open position (allowing flow through the catalyst units 66 disposed under flapper 77) and flapper 77' is in the horizontal, closed position (preventing flow through the catalyst units disposed under flapper 77'). As the catalyst units 66 disposed under flapper 77 become depleted, flapper 77' is repositioned to the vertical, open position (allowing flow through the catalyst units 66 disposed under flapper 77'). Flapper 77 may be repositioned to the closed position. Alternatively, flapper 77 may remain in the open position, to allow use of any residual $NO_x$ removal capability of the catalyst units 66 disposed thereunder. If it is expected that flapper 77 will never be positioned in the close position, only flapper 77' need be installed.

Alternatively, the SCR segment 28 may contain upper and lower groups 68, 70 of two catalyst units 66 or a single layer of one to eight catalyst units 66, depending on the amount of $NO_x$ which must be removed and other application specific considerations. If space permits, and if other pollutants (e.g. CO, hydrocarbons, etc.) must be removed from the flue gas, catalyst units 78 targeting such other pollutants or catalyst units 80 removing $NO_x$ plus such other pollutants may be included in the SCR segment 28. Alternatively, the housing 82 located above the SCR segment 28 may be converted into a second SCR segment to provide for removing additional $NO_x$ and/or other pollutants.

As noted above, the emission treatment system 10 may be installed without significantly interrupting use of the ethylene-cracking furnace 12 by eliminating the need to make major modifications to the stack 22. The impact on the plant is further reduced by the modular construction of the major component module 26. The major component module 26 includes upper, middle and lower sub-modules 84, 85, 86. The lower sub-module 86 includes the ID fan 32, an outlet transition piece 88, and power and controls boxes (not shown), all of which are mounted on a base plate 90. The middle sub-module 85 includes the heat exchange segment 30. The upper sub-module 84 includes the SCR segment 28 and the inlet transition piece 42. Each of the sub-modules 84, 85, 86 is sized to fit on a conventional flat-bed tractor trailer.

With reference to FIGS. 5–8, installation of the emission treatment system 10 is a relatively simple process, providing for a low on-site construction time and minimal disruption of normal refinery activities. A number of activities are required take place in preparation 92 for the arrival of the major component module 26. The installation site of the major component module 26 must be selected 94 and an appropriate foundation installed 96 at such installation site. The location of the flue gas take-off and return openings 36, 38 must be determined 98. The heat exchanger take-off and return must be identified 100. Sources for the ammonia vapor, electric power, and control air (if needed) must be identified 102, 104, 106. Finally, all control system interfaces must be identified 108. It should be appreciated that the majority of these tasks may be conducted in parallel.

Initial installation 110 begins by setting 112 the lower sub-module 86 on the foundation with a crane and securing 114 the base plate 90 to the foundation with anchor bolts (not shown). The crane is then used to set 115 the middle sub-module 85 on top of lower sub-module 86, set 116 the upper sub-module 84 on top of middle sub-module 85 and the three sub-modules 84, 86 are welded 118 together. The crane is then used to set 120 the inlet and outlet ductwork 40, 44 in place, along with its appropriate support structure, and the ductwork 40, 44 is connected to inlet transition piece 42 and outlet transition piece, respectively. The ammonia injection grid (AIG) 60 is installed 121, including connection to the ammonia vapor source 58. Connecting flanges 122 are welded 124 to the stack 22 at the location where the flue gas take-off and return openings 36, 38 will be cut, but openings 36 and 38 are not cut at this time. Interconnecting piping 126 is run 128 between the new heat exchanger segment 30 and the heat exchanger take-off and return and connected to heat exchanger segment 30. Using the crane again, platforms and ladders 130 are mounted 132 to the major components module 26. The instrumentation is installed and the ammonia vapor feed, electric power, control, and instrumentation connections are installed 134 with the corresponding system devices. The catalyst units 66 are loaded 136 in the SCR segment 28. Commissioning and pre-start procedures are conducted 138. During a scheduled tie-in outage 140, the flue gas take-off and return openings 36, 38 are cut 142, the blank/damper 34, 34' is installed 144 within the stack 22, and the heat exchanger feed and return lines 126 are connected 146 to the heat exchanger segment 30 and the take-off and the return. Finally, the ethylene-cracking furnace 12 and emission treatment system 10 are started-up 150.

Figure 9:
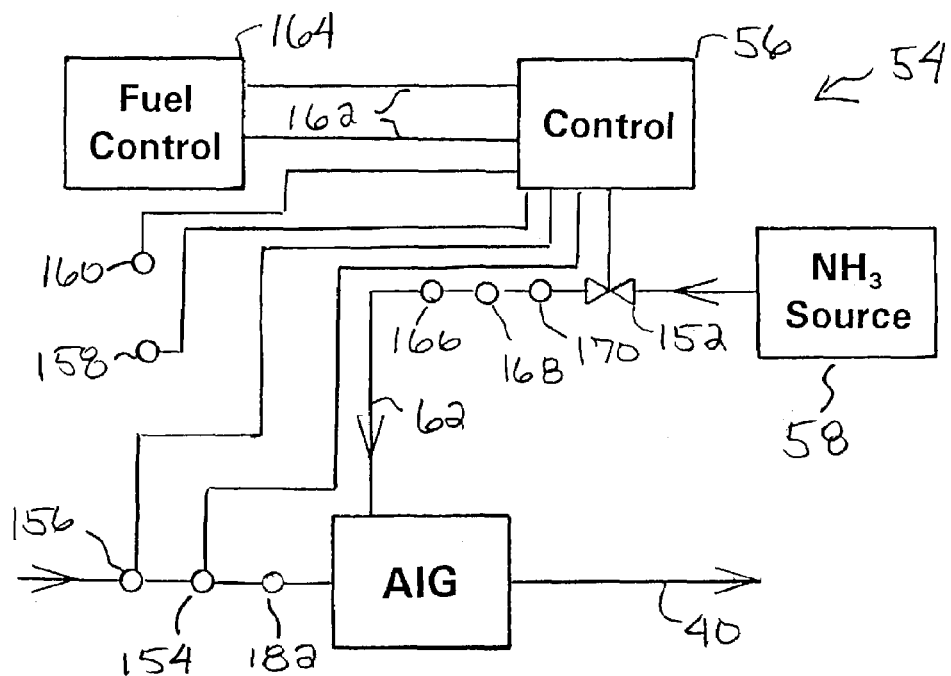
FIG. 9 is a simplified, schematic view of the ammonia addition subsystem.

As discussed above, the motive force for injecting the ammonia vapor into the flue gas stream is provided by the vapor pressure of the ammonia in the ammonia source 58. With reference to FIG. 9, a throttle valve 152 in ammonia vapor pipe 62 controls the flow of the ammonia vapor into the AIG 60. Preferably, valve 152 is controlled by the controller 56 on the basis of the flue gas flow rate, the amount of $NO_x$ entering the emission treatment system 10, and the amount of $NO_x$ exiting the emission treatment system 10. A flow sensor 154 positioned upstream of AIG 60 and $NO_x$ detectors 156, 158 located upstream of AIG 60 and at the outlet of fan 32, respectively, provide the necessary inputs to controller 56 to control ammonia addition in this manner. Alternatively, ammonia addition may be controlled on the basis of ammonia carry-over or slip. For control in this manner, an ammonia sensor 160 may be positioned at the outlet of fan 32. In still another alternative, ammonia addition may be controlled on the basis of the fuel flow to the burners 14 and the composition of such fuel. Interconnections 162 may be provided between controller 56 and the fuel control 164 of the furnace 12 to control in this manner. Ammonia vapor flow may be monitored by pressure, temperature and flow detectors 166, 168, 170 disposed in ammonia vapor pipe 62.

Figure 10:
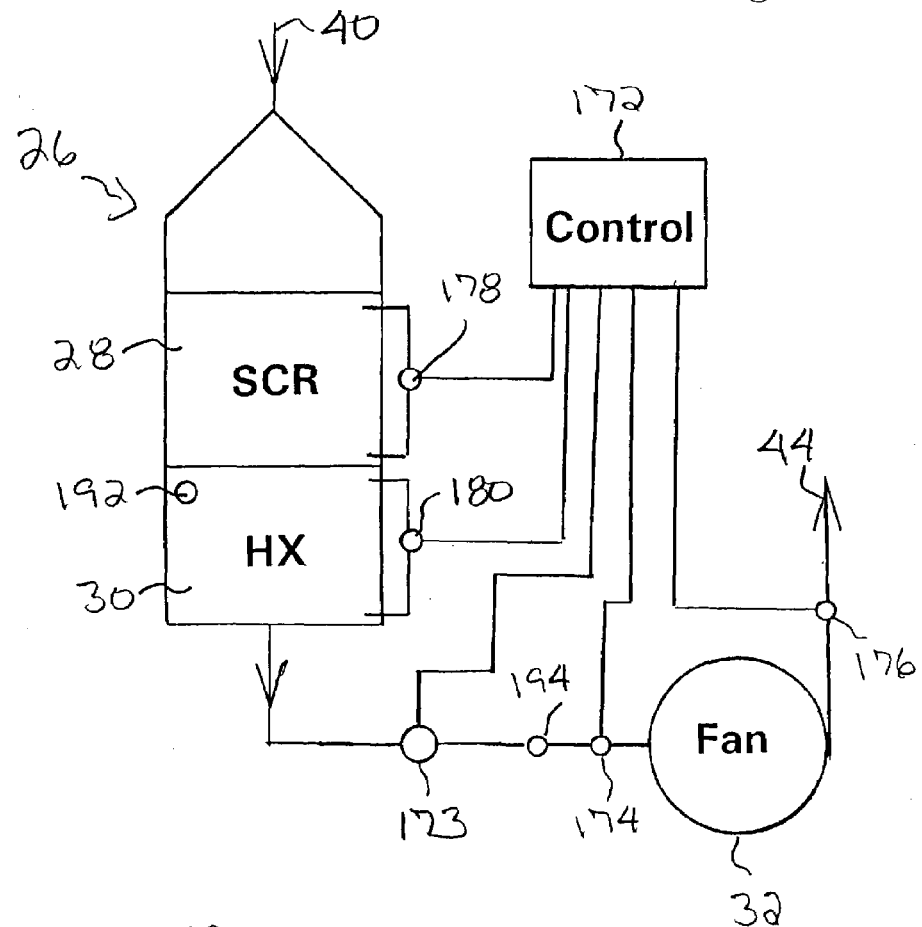
FIG. 10 is a simplified, schematic view of the fan control system.

With reference to FIG. 10, proper flow of the flue gas through the emission treatment system 10 is maintained by a controller 172 which controls the position of a damper 173 in the inlet of fan 32 on the basis of the fan supply pressure, the fan discharge pressure, the differential pressure across SCR 28, and the differential pressure across heat exchanger 30. Pressure detectors 174, 176 at the inlet and outlet of fan 32, respectively, and differential pressure detectors 178, 180 on SCR 28 and heat exchanger 30, respectively, provide necessary inputs to controller 172. The temperature of the flue gas stream may be monitored by a temperature detector 182 positioned upstream of AIG 60 (FIG. 9).

Figure 11:
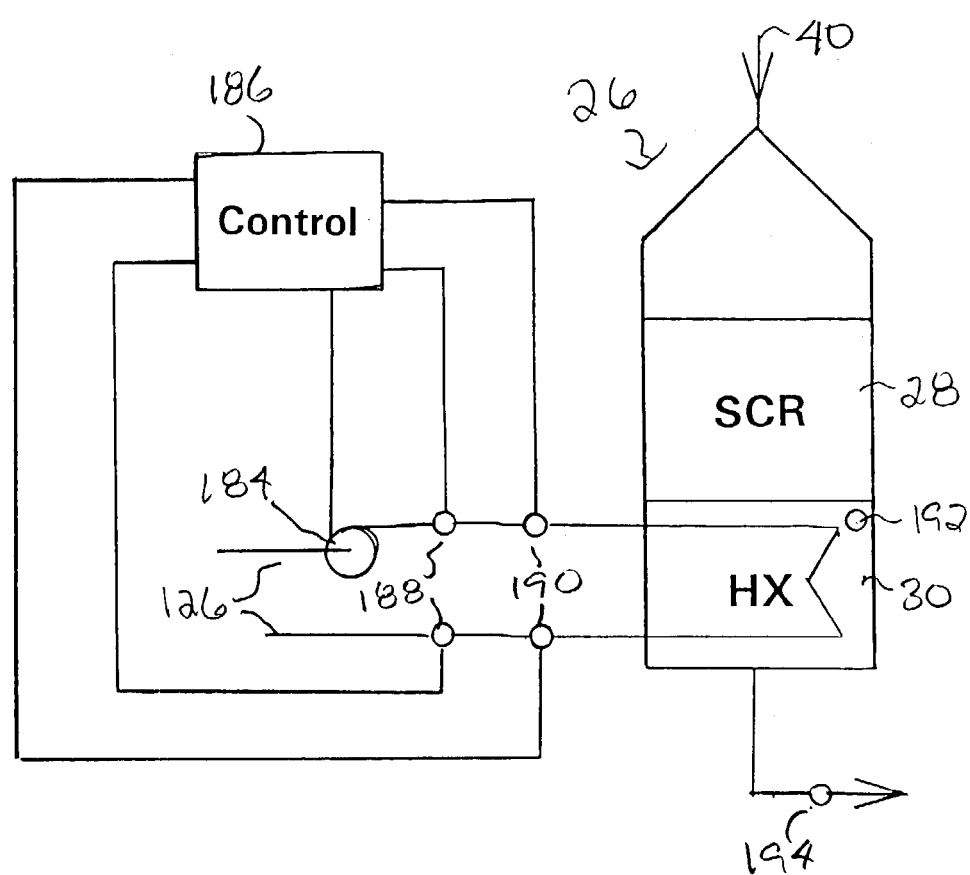
FIG. 11 is a simplified, schematic view of the heat exchanger coolant control system.

With reference to FIG. 11, a feed pump 184 in the heat exchanger feed and return lines 126 controls the flow of the boiler feedwater through heat exchanger 30. The speed of pump 184 is controlled by a controller 186 on the basis of the boiler feedwater pressure and temperature. Pressure sensors 188 and temperature sensors 190 positioned in the boiler feedwater inlet and outlet of the heat exchanger 30 provide the necessary inputs to controller 56 to feedwater flow in this manner. Temperature detectors 192, 194 in the flue gas stream upstream and downstream of heat exchanger 30, respectively, allow the efficiency of the heat exchanger 30 to be monitored.

The emission treatment system 10 described above is intended for use in treating flue gas having little or no sulfur. If sulfur is present or expected to be present in the flue gas, such sulfur must be removed before the flue gas enters the SCR segment 28. The major components module 26 is also described above as a vertical system. The benefit of such a vertical system is that it reduces the size of the foot print required for installing the module 26. However, if the foot print size is not a concern, the major components module 26 may be installed as a horizontal system, thereby providing easier access to the SCR and heat exchange segments 28, 30.

Many ethylene-cracking furnaces 12 have relied on "first generation" low $NO_x$ burners to reduce $NO_x$ emissions to levels which were acceptable under the old emissions standards. However, newer "second generation" low $NO_x$ burners must be used to attain levels which are acceptable under the new emissions standards. The second generation low $NO_x$ burners adversely affect the efficiency of the furnace 12 due to the different flame shape and heat distribution produced by such burners, compared to first generation low $NO_x$ burners. It should be appreciated that the use of the emission treatment system 10 allows the continued use of the first generation low $NO_x$ burners, thereby maintaining the ethylene-cracking furnace 12 at peak efficiency. In addition, burner control systems may be used which optimize burner efficiency.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for removing pollutants from flue gas with an emission treatment system, the flue gas being generated by a plant having one or more burners located at an inlet end of a vertically extending stack, the stack including a first ID fan disposed therein, the flue gas being discharged through an outlet end of the stack, the emission treatment system including a major component module, inlet ductwork attached to the stack at a first position intermediate the inlet end of the stack and the first ID fan, and outlet ductwork attached to the stack at a second position intermediate the first ID fan and the outlet of the stack, the major component module having an SCR segment, a heat exchanger segment, and a second ID fan, the SCR segment having at least one catalyst unit composed of materials for selectively catalyzing at least one pollutant, the inlet and outlet ductwork providing fluid communications between the stack and the major component module, the method comprising the following steps:

closing the stack at a third position intermediate the first and second positions to prevent the flow of flue gas through the first ID fan;

drawing the flue gas from the stack through the inlet ductwork and through the major component module with the second ID fan;

removing the pollutant from the flue gas with the SCR segment of the major component module to produce a clean flue gas; and discharging the clean flue gas through the outlet ductwork to the stack with the second ID fan.

2. The method of claim 1 further comprising the step of controlling the flow rate of the flue gas through the major component module by regulating the pressure decrease across the second ID fan with a damper controller.

3. The method of claim 2 wherein the step of controlling the flow rate of the flue gas comprises the sub-steps of:

monitoring a second ID fan supply pressure with the controller;

monitoring a second ID fan discharge pressure with the controller;

monitoring differential pressure across the SCR segment with the controller;

monitoring differential pressure across the heat exchange segment with the controller; and regulating the position of a damper upstream of the second ID fan on the basis of the second ID fan supply and discharge pressures and the differential pressures across the SCR and heat exchange segments.

4. The method of claim 3 wherein the step of controlling the flow rate of the flue gas comprises the sub-step of monitoring the temperature of the flue gas in the inlet ductwork.

5. The method of claim 1 wherein the pollutant to be removed is NOX, the emission treatment system also includes an ammonia addition subsystem in fluid communication with the inlet ductwork, and at least one catalyst unit is composed of materials for selectively catalyzing NOX, the method further comprising the step of mixing ammonia vapor with the flue gas upstream of the SCR segment.

6. The method of claim 5 wherein the step of mixing ammonia vapor includes:

injecting ammonia vapor into the inlet ductwork; and mixing the ammonia vapor with the flue gas over the length of the inlet ductwork.

7. The method of claim 6 wherein the step of mixing ammonia vapor also includes creating turbulence in the flue gas by changing the direction of flue gas flow from a vertical direction in the stack to a horizontal direction in the inlet ductwork.

8. The method of claim 6 wherein the ammonia addition subsystem includes a source of ammonia vapor, an ammonia injection grid disposed in the inlet ductwork, an ammonia vapor pipe providing fluid communication between the source of ammonia vapor and the ammonia injection grid, and a throttle valve disposed in the ammonia vapor pipe, the step of mixing ammonia vapor also including controlling the rate of ammonia addition by regulating the throttle valve with an ammonia addition controller.

9. The method of claim 8 wherein the step of mixing ammonia vapor also includes biasing the ammonia vapor into the flue gas stream with the vapor pressure of the ammonia in the source of ammonia.

10. The method of claim 8 wherein the step of controlling the rate of ammonia addition includes:

monitoring the flue gas flow rate with the ammonia addition controller;

monitoring the level of NOX entering the emission treatment system with the ammonia addition controller;

monitoring the level of NOX exiting the emission treatment system with the ammonia addition controller; and regulating the throttle valve on the basis of the flue gas flow rate and the level of NOX entering and exiting the emission treatment system.

11. The method of claim 8 wherein the step of controlling the rate of ammonia addition includes:

monitoring the level of ammonia exiting the second ID fan; and regulating the throttle valve on the basis of ammonia carry-over.

12. The method of claim 8 wherein the step of controlling the rate of ammonia addition includes:

monitoring the rate of fuel flow to the burners with the ammonia addition controller;

monitoring the composition of the fuel with the ammonia addition controller; and regulating the throttle valve on the basis of the fuel flow rate and the composition of the fuel.

13. The method of claim 8 wherein the step of controlling the rate of ammonia addition includes monitoring the pressure, temperature and flow rate of the ammonia vapor flow in the ammonia vapor pipe.

14. The method of claim 1 wherein the plant also has a boiler and a feed pump circulating feedwater to the boiler, the step of closing the stack prevents the flow of flue gas through the feedwater heating coil, and the method further comprises the step of controlling the flow of the feedwater through the heat exchange segment by regulating the speed of the feed pump with a pump speed controller.

15. The method of claim 14 wherein the step of controlling the flow of feedwater comprises the sub-steps of:

monitoring the pressure of the feedwater in the feed line with the pump speed controller;

monitoring the temperature of the feedwater in the feed line with the pump speed controller;

monitoring the pressure of the feedwater in the return line with the pump speed controller;

monitoring the temperature of the feedwater in the return line with the pump speed controller; and regulating the feed pump on the basis of the feedwater temperature and pressure in the feed and return lines.

16. The method of claim 1 further comprising the step of monitoring the temperature of the flue gas in the SCR segment and the second ID fan.

17. A method for removing NOX from flue gas with an emission treatment system, the flue gas being generated by a plant having one or more burners located at an inlet end of a vertically extending stack, the stack including a first ID fan disposed therein, the flue gas being discharged through an outlet end of the stack, the emission treatment system including a major component module, inlet ductwork, outlet ductwork, and an ammonia addition subsystem, the major component module having an SCR segment, a heat exchanger segment, and a second ID fan, the SCR segment having at least one catalyst unit composed of materials for selectively catalyzing NOX, the ammonia addition subsystem being in fluid communication with the inlet ductwork, the method comprising the following steps:

attaching the inlet ductwork to the stack at a first position intermediate the inlet end of the stack and the first ID fan;

attaching the outlet ductwork to the stack at a second position intermediate the first ID fan and the outlet of the stack;

closing the stack at a third position intermediate the first and second positions to prevent the flow of flue gas through the first ID fan;

drawing the flue gas from the stack through the inlet ductwork and through the major component module with the second ID fan;

injecting ammonia vapor into the inlet ductwork with the ammonia addition subsystem;

removing the NOX from the flue gas with the SCR segment of the major component module to produce a clean flue gas; and discharging the clean flue gas through the outlet ductwork to the stack with the second ID fan.

18. The method of claim 17, wherein the plant also has a boiler and a feed pump circulating feedwater to the boiler through a feedwater heating coil disposed in the stack, the step of closing the stack prevents the flow of flue gas through the feedwater heating coil, and the method further comprises the step of controlling the flow of the feedwater through the heat exchange segment by regulating the speed of the feed pump with a pump speed controller.

19. A method for removing NOX from flue gas with an emission treatment system, the flue gas being generated by a plant having one or more burners located at an inlet end of a vertically extending stack, the stack including a first ID fan and a feedwater heating coil disposed therein, the flue gas being discharged through an outlet end of the stack, the plant also having a boiler and a feed pump circulating feedwater to the boiler, the emission treatment system including a major component module, inlet ductwork, outlet ductwork, and an ammonia addition subsystem, the major component module having an SCR segment, a heat exchanger segment, and a second ID fan, the SCR segment having at least one catalyst unit composed of materials for selectively catalyzing NOX, the heat exchanger segment having feedwater feed and return lines, the ammonia addition subsystem having a source of ammonia vapor, an ammonia injection grid disposed in the inlet ductwork, an ammonia vapor pipe providing fluid communication between the source of ammonia vapor and the ammonia injection grid, and a throttle valve disposed in the ammonia vapor pipe, the method comprising the following steps:

attaching the inlet ductwork to the stack at a first position intermediate the inlet end of the stack and the first ID fan;

attaching the outlet ductwork to the stack at a second position intermediate the first ID fan and the outlet of the stack;

closing the stack at a third position intermediate the first and second positions to prevent the flow of flue gas through the first ID fan and the feedwater heating coil;

drawing the flue gas from the stack through the inlet ductwork and through the major component module with the second ID fan;

injecting ammonia vapor into the inlet ductwork with the ammonia addition subsystem;

removing the NOX from the flue gas with the SCR segment of the major component module to produce a clean flue gas;

discharging the clean flue gas through the outlet ductwork to the stack with the second ID fan;

controlling the flow rate of the flue gas through the major component module by regulating the pressure decrease across the second ID fan;

controlling the rate of ammonia addition by regulating the throttle valve; and controlling the flow of the feedwater through the heat exchange segment by regulating the speed of the feed pump.

* * * * *